United States Patent
Boehm et al.

(10) Patent No.: US 12,094,343 B2
(45) Date of Patent: Sep. 17, 2024

(54) VEHICLE ACCESS AND FLEET MANAGEMENT CONTROL VIA BLUETOOTH BEACONS

(71) Applicant: Textron Inc., Providence, RI (US)

(72) Inventors: Christopher A. Boehm, North Augusta, GA (US); Marian-Andrei Bungeanu, Arges (RO); Radu Selea, Pitesti (RO); Robert Gabriel Stanciu, Pitesti (RO); Ionut-Gabriel Bungeanu, Arges (RO)

(73) Assignee: Textron Innovations Inc., Providence, RI (US)

( * ) Notice: Subject to any disclaimer, the term of this patent is extended or adjusted under 35 U.S.C. 154(b) by 380 days.

(21) Appl. No.: 17/392,759

(22) Filed: Aug. 3, 2021

(65) Prior Publication Data

US 2023/0040437 A1 Feb. 9, 2023

Related U.S. Application Data

(60) Provisional application No. 63/216,751, filed on Jun. 30, 2021.

(51) Int. Cl.
*G06K 7/14* (2006.01)
*G08G 1/00* (2006.01)
*H04W 4/80* (2018.01)

(52) U.S. Cl.
CPC .............. *G08G 1/20* (2013.01); *G06K 7/143* (2013.01); *H04W 4/80* (2018.02)

(58) Field of Classification Search
CPC ............ G08G 1/20; H04W 4/80; G06K 7/143
See application file for complete search history.

(56) References Cited

U.S. PATENT DOCUMENTS

| | | | |
|---|---|---|---|
| 5,053,768 A | 10/1991 | Dix, Jr. | |
| 5,685,786 A | 11/1997 | Dudley | |
| 6,992,583 B2 | 1/2006 | Muramatsu | |
| 8,108,140 B2 | 1/2012 | Sato | |
| 9,087,246 B1 * | 7/2015 | Chin | H04W 4/80 |
| 10,083,431 B2 * | 9/2018 | Jones | H04L 67/125 |

(Continued)

OTHER PUBLICATIONS

International Search Report and Written Opinion for PCT/US2022/023865 mailed Jul. 8, 2022.

(Continued)

*Primary Examiner* — Jess Whittington
*Assistant Examiner* — Terry C Buse
(74) *Attorney, Agent, or Firm* — Sandberg Phoenix & von Gontard, P.C.

(57) ABSTRACT

A Bluetooth plus radio frequency identification (RFID) beacon for use vehicle fleet management and geofencing system, wherein the beacon comprises a housing, and a circuit board disposed within the housing. The circuit board comprises a Bluetooth communication circuitry portion containing a unique media access control (MAC) address, and an RFID circuitry portion integrated with the Bluetooth communication circuitry portion such that the RFID circuitry portion is associated with the Bluetooth circuitry MAC address whereby the Bluetooth beacon can be identified, via the MAC address, by an RFID reader communicating with the RFID circuitry portion using the MAC address of the Bluetooth communication circuitry portion.

20 Claims, 6 Drawing Sheets

(56) References Cited

U.S. PATENT DOCUMENTS

| | | | |
|---|---|---|---|
| 10,154,377 B2 | 12/2018 | Post et al. | |
| 10,809,741 B2 | 10/2020 | Hille et al. | |
| 2009/0249457 A1* | 10/2009 | Graff | G06F 21/6218 |
| | | | 709/228 |
| 2012/0046982 A1 | 2/2012 | Wellman | |
| 2015/0341891 A1* | 11/2015 | Pentti | H04W 4/33 |
| | | | 455/456.1 |
| 2016/0297398 A1 | 10/2016 | Jefferies et al. | |
| 2017/0039632 A1* | 2/2017 | Meagher | H04W 8/005 |
| 2017/0039668 A1* | 2/2017 | Luke | G07C 5/008 |
| 2017/0178477 A1 | 6/2017 | Turgeon | |
| 2017/0349058 A1 | 12/2017 | Bernier et al. | |
| 2017/0372534 A1 | 12/2017 | Steketee et al. | |
| 2018/0170342 A1 | 6/2018 | Brandt et al. | |
| 2018/0211450 A1* | 7/2018 | Gresch | G07C 5/008 |
| 2020/0082716 A1* | 3/2020 | Britt | G01C 21/3492 |
| 2021/0127175 A1* | 4/2021 | Salian | H04N 21/42684 |
| 2022/0051513 A1* | 2/2022 | Schmidt | G07C 9/00571 |
| 2022/0114873 A1* | 4/2022 | Williams | G08B 21/0269 |
| 2022/0299593 A1* | 9/2022 | Abir | G01S 5/0284 |

OTHER PUBLICATIONS

What are VOXX Power Systems?; VOXX Electronics Corporation; Dec. 15, 2020.

* cited by examiner

VEHICLE ACCESS AND FLEET MANAGEMENT CONTROL VIA BLUETOOTH BEACONS

CROSS-REFERENCE TO RELATED APPLICATIONS

This application claims the benefit of U.S. Provisional Application No. 63/216,751, filed on Jun. 30, 2021. The disclosure of the above application is incorporated herein by reference in its entirety.

FIELD

The present teachings relate to vehicle fleet management, and more particularly to the use of Bluetooth beacons as a form of vehicle access, vehicle tracking and personal tracking.

BACKGROUND

The statements in this section merely provide background information related to the present disclosure and may not constitute prior art.

Often lightweight low speed vehicles such as golf cars, passenger transport or shuttle vehicles, maintenance or ground care utility vehicles, turf mowers, cargo vehicles, or any other lightweight low-speed vehicles are utilized by golf courses, country clubs, resorts, rental facilities, theme parks, airports, military bases, universities, sporting and recreation facilities, etc., for a plurality of purposes. With use of such vehicles at such facilities, it is often desirable to employ a fleet management and terrestrial travel boundary control systems in order to be able to monitor and regulate a variety of parameters based on the type of vehicle, the person or people that will be driving the vehicle, and the environment in which the vehicle will be utilized. For example, it may be desirable to regulate the speed, hours of operation, and/or terrestrial travel boundaries of a resort passenger transport vehicle based on whether a resort guest will be driving the vehicle, or a resort employee will be driving the vehicle.

Known global positioning system (GPS) based fleet management and terrestrial travel boundary control (often referred to as geofencing) systems are limited to use only where the vehicles to be tracked are accessible to GPS signals. However, when such vehicles travel in areas where they are not accessible to GPS signals, e.g., caves, warehouses, underground vehicle storage barns, GPS based fleet management and geofencing systems become inoperable and are no longer able to track and control such vehicles. Additionally, known GPS based fleet management and geofencing systems can be expensive, complex, and hard to maintain and are unreliable.

SUMMARY

In various embodiments, the present disclosure provides a Bluetooth plus radio frequency identification (RFID) beacon for use vehicle fleet management and geofencing system, wherein the beacon comprises a housing and a circuit board disposed within the housing. In various embodiments the circuit board comprises a Bluetooth communication circuitry portion containing a unique media access control (MAC) address, and an RFID circuitry portion integrated with Bluetooth communication circuitry such RFID is associated with the Bluetooth circuitry MAC address whereby the Bluetooth beacon can be identified by an RFID reader communicating with the RFID circuitry using the MAC address of the Bluetooth circuitry.

In various embodiments, the beacon further comprises a machine readable identification code disposed on the housing, wherein the machine readable identification code utilizable to assign the beacon to a facility guest or employee by associating the machine readable identification code with the MAC address.

In various embodiments, the beacon further comprises a battery for powering the circuit board.

In various other embodiments, the present disclosure provides a Bluetooth beacon based fleet management and geofencing system (BTBFMGS), wherein the system comprises a fleet management and geofencing system (FMGS) central serve, at least one FMGS facility computer communicatively connected to the central server, and a plurality of FMGS tablets communicatively connected to the central server, each FMGS tablet disposed in a respective one of a plurality of facility guest vehicles, each FMGS tablet structured and operable for Bluetooth communication. In various embodiments, the BTBFMGS additionally comprises a plurality of FMGS computer modules communicatively connected to the central server, each FMGS computer module disposed in a respective one of a plurality of facility utility vehicles. In various embodiments, the BTBFMGS additionally comprises a plurality of radio frequency identification (RFID) readers each RFID reader disposed in a respective one of the plurality of facility utility vehicles and communicatively connected to the respective FMGS computer module. The BTBFMGS further comprises a plurality of Bluetooth and RFID beacons, each beacon is structured and operable to communicate with the plurality of FMGS tablets via Bluetooth communication and with the plurality of RFID reader via radio frequency communication. In various embodiments, each beacon comprises a housing and a circuit board disposed within the housing. The circuit board comprises a Bluetooth communication circuitry portion containing a unique media access control (MAC) address and an RFID circuitry portion integrated with Bluetooth communication circuitry portion such RFID circuitry portion is associated with the Bluetooth circuitry MAC address, whereby the Bluetooth beacon can be identified by the RFID readers communicating with the RFID circuitry portion using the MAC address of the Bluetooth communication circuitry portion.

In various embodiments, the BTBFMGS further comprises an identification code (e.g., a quick response (QR) code) disposed on the housing to assign the beacon to a facility guest or employee by associating the identification code with the MAC address of the respective beacons.

In various embodiments, each beacon is structured and operable to be assigned, via the identification code and the respective MAC address, to one of: a respective facility guest and be utilized by the guest as a Bluetooth key for enabling and disabling operation of one of the facility guest vehicles; a respective facility employee and be utilized by the employee as a RFID employee identification badge for enabling and disabling operation of one of the facility utility vehicles; and/or a particular geographical terrestrial location for use as a geofencing and location tracking marker for the facility guest vehicles and the facility utility vehicles.

In various embodiments, each beacon used as the geofencing and location tracking marker is disposed at the respective particular terrestrial geographical location.

In various embodiments, each FMGS tablet and each FMGS computer module is communicatively connected to at least one vehicle control module that is structured and operable to control at least one vehicle operational parameter such that each FMGS tablet and each FMGS computer module can control the at least one vehicle operational parameter based on at least one of; guest authorization parameters of privileges associated with the MAC address of the beacon assigned to the respective facility guest, and/or employee authorization parameters or privileges associated with the MAC address of the beacon assigned to the respective facility employee.

In various embodiments, the at least one vehicle operational parameter comprises at least one of: a locked/unlocked operational status of the vehicle; vehicle speed, via control of one of a vehicle prime mover speed; and/or direction of motive force generated by the prime mover.

In various embodiments, each FMGS tablet and each FMGS computer module is structured and operable to, in real time, communicate with the beacons utilized as location tracker, via Bluetooth communications, and communicate with the FMGS central server, via at least one of cellular communication and WiFi communications, to provide vehicle location information to the FMGS central server, which is accessible by at least one FMGS facility computer.

In various embodiments, the particular terrestrial geographical location is a terrestrial geographical location that is not accessible to global positioning system (GPS) satellite signals.

In various embodiments, when one of the plurality of beacons is assigned to a facility guest, information regarding the guest is associated with the MAC address of the respective beacon such that when the guest pairs the respective beacon with one of the FMGS tablets, the respective FMGS tablet will display information relevant to the facility guest.

By placing a Bluetooth and RFID beacon in a fixed location with precise known GPS coordinates vehicle's location can be determined with a high degree of certainty every time the vehicle comes into proximity of the beacon. When multiple beacons are used along a path the need for a GPS signal is eliminated and live 'breadcrumb trail' can be displayed for customers to see, thus showing a location without live real time GPS signals and communication This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figure 5:
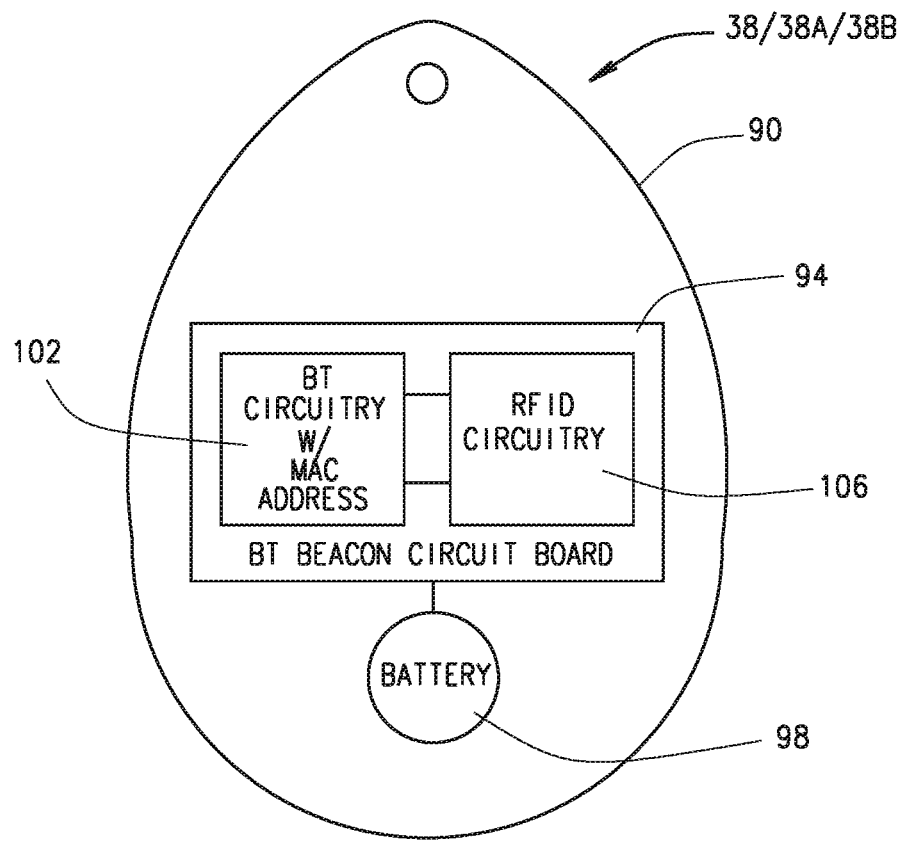

FIG. 5 block diagram of a of Bluetooth-plus-RFID (BTRFID) beacon of the BTBFMGS, in accordance with various embodiments of the present disclosure.

Figure 6:
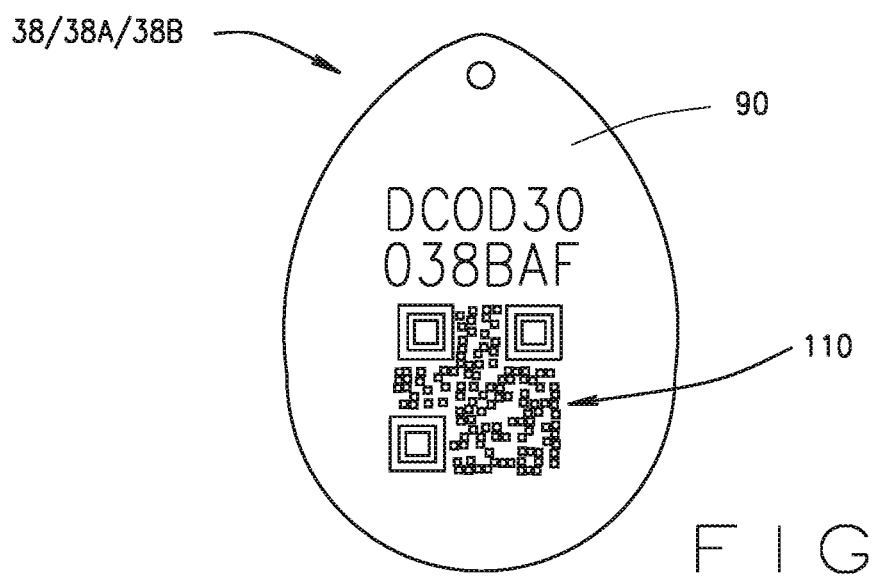

FIG. 6 is a front view of the BTRFID beacon having a machine-readable identification code disposed on a face of the beacon, in accordance with various embodiments of the present disclosure.

Figure 7:
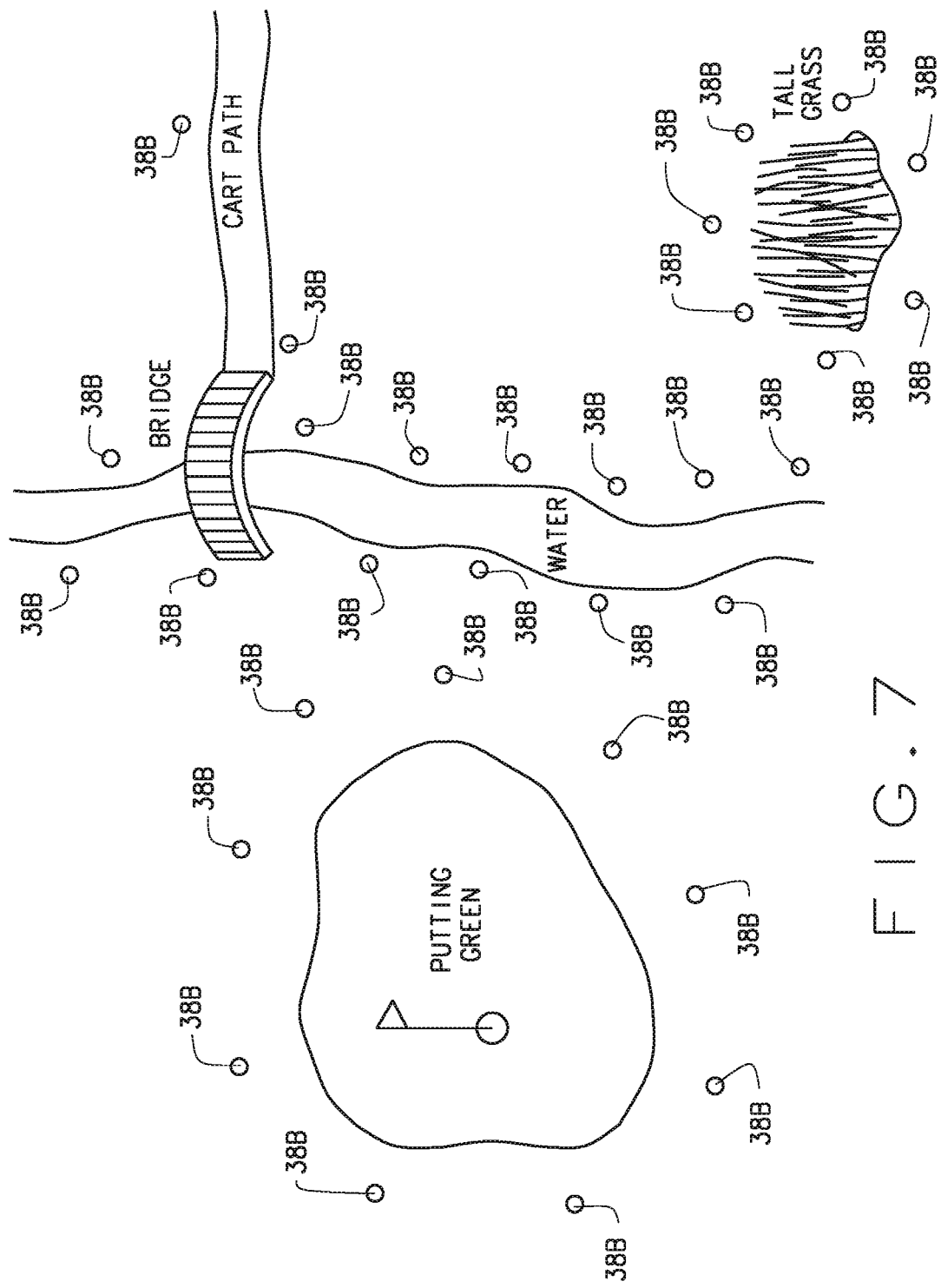

FIG. 7 is an exemplary diagram of a portion of a golf course having a plurality of the BTRFID beacons used as geographical markers, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

The apparatuses/systems and methods described herein can be implemented at least in part by one or more computer program products comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

As used herein, the term module can refer to, be part of, or include an application specific integrated circuit (ASIC); an electronic circuit; a combinational logic circuit; a field programmable gate array (FPGA); a processor (shared, dedicated, or group) that performs instructions included in code, including for example, execution of executable code instructions and/or interpretation/translation of uncompiled code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Figure 1:
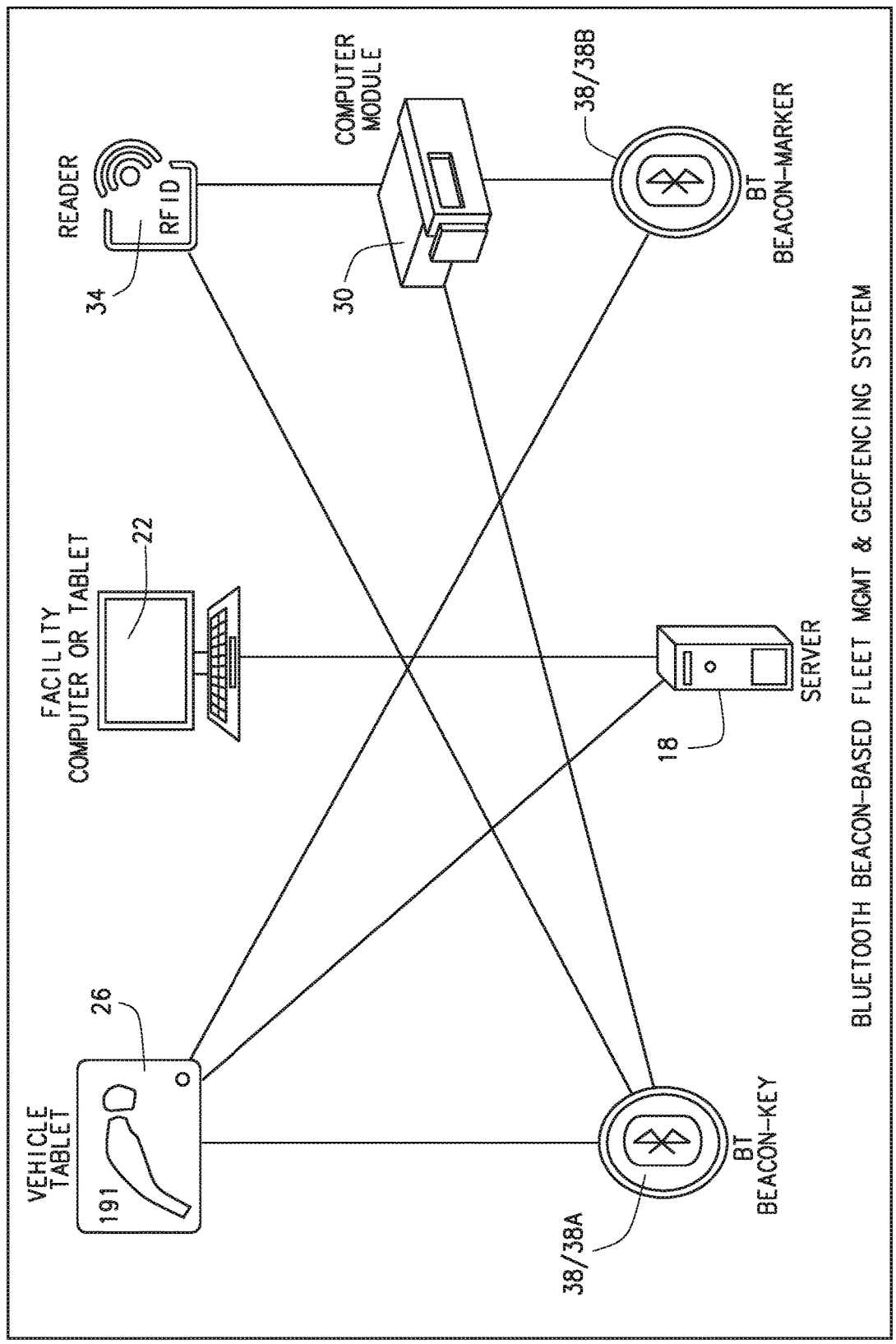
FIG. 1 is a schematic of a Bluetooth beacon based fleet management and geofencing system (BTBFMGS) in accordance with various embodiments of the present disclosure.
Figure 2:
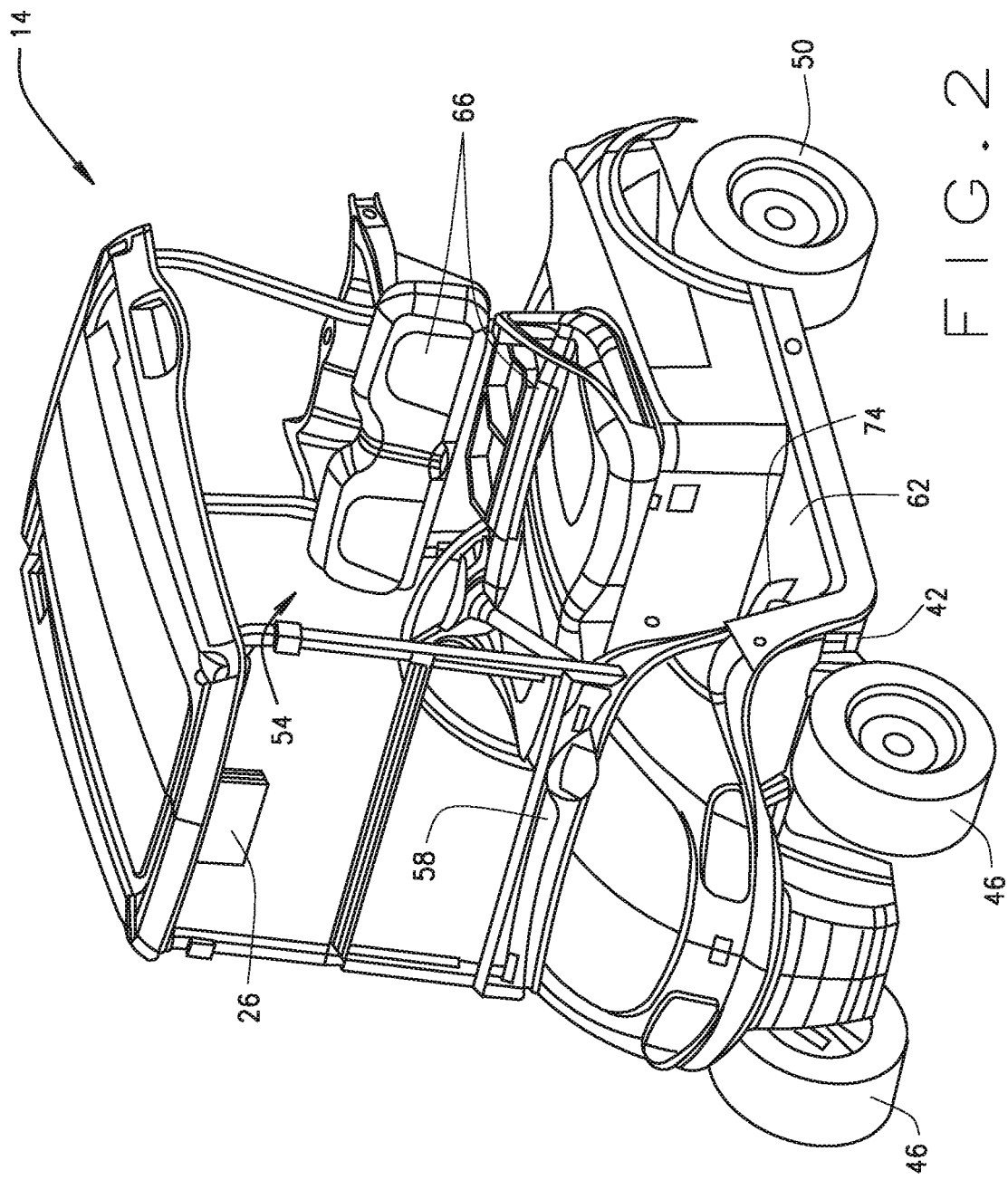
FIG. 2 is an isometric view of a vehicle, exemplarily illustrated as a golf car, comprising a fleet management and geofencing system (FMGS) vehicle tablet of the BTBFMGS, in accordance with various embodiments.
Figure 3:
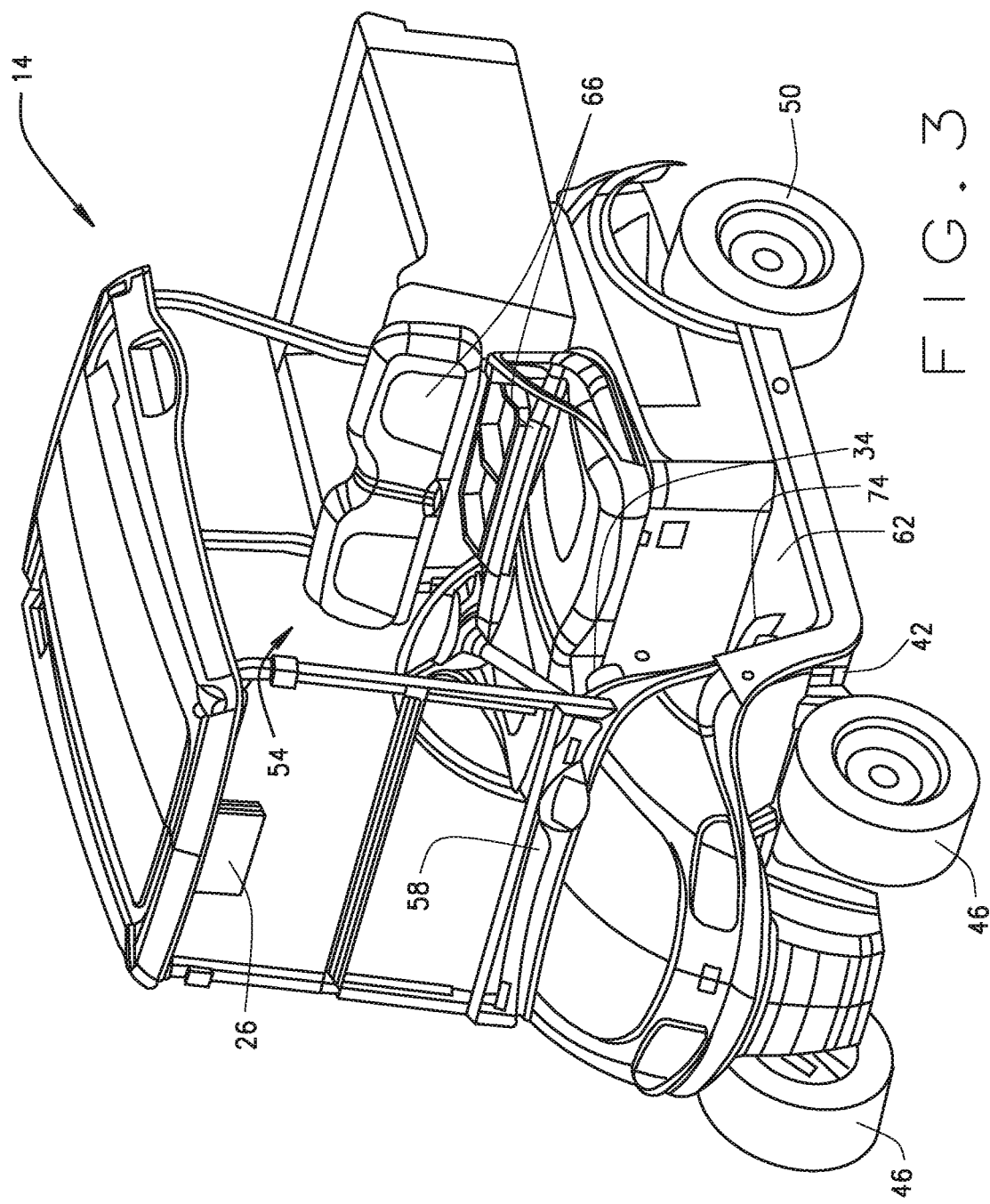
FIG. 3 is an isometric view of a vehicle, exemplarily illustrated as a work/utility vehicle, comprising FMGS vehicle module of the BTBFMGS, in accordance with various embodiments.
Figure 4:
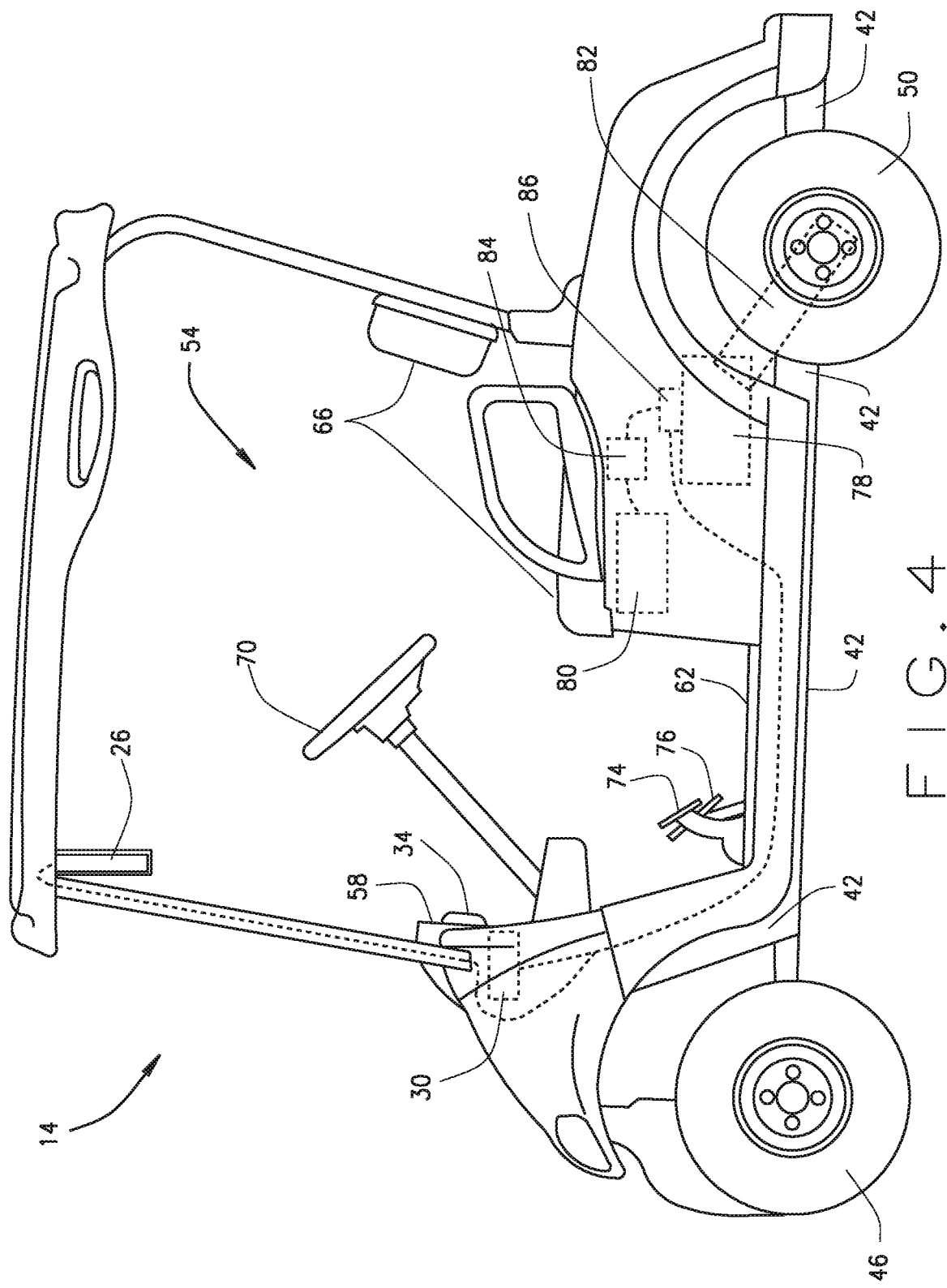
FIG. 4 is a side view of a vehicle, exemplarily illustrated as a personal transport vehicle, comprising FMGS vehicle tablet of the BTBFMGS, in accordance with various embodiments.

Referring now to FIGS. 1, 2, 3 and 4, the present disclosure generally provides a Bluetooth beacon based fleet management and geofencing system (BTBFMGS) 10 that is structured and operable to manage, monitor, track and control various operations of a fleet of lightweight vehicles, such as a golf car 14 exemplarily shown in FIG. 2, a personal transport vehicle exemplarily shown in FIG. 4, or a utility vehicle exemplarily shown in FIG. 3. The BTBFMGS 10 is advantageously implemented to manage, monitor, track and control various operational parameters of a fleet (i.e., a plurality) of lightweight low speed vehicles 14 such as golf cars, passenger transport or shuttle vehicles, maintenance or ground care utility vehicles, turf mowers, cargo vehicles, or any other lightweight low speed vehicles that are utilized by golf courses, country clubs, resorts, rental facilities, theme parks, airports, military bases, universities, sporting and recreation facilities, etc. . . . For example, the BTBFMGS 10 is structured and operable to use Bluetooth based communication technology to manage, monitor, track and control various vehicle operational parameters such as: assignment of authorized vehicle operators; vehicle range, speed and operation control based on operator assignment; and geographical boundary regulation based on operator assignment. Moreover, the BTBFMGS 10 is structured and operable to use Bluetooth based communication technology to manage, monitor, track and control such vehicle operational parameters in areas or environments where global positioning system (GPS) satellite signals are inaccessible, inoperable and/or ineffective for use in managing, monitoring, tracking and/or controlling such vehicle operational parameters, for example, when the vehicle 14 is located or travels within caves, warehouses, underground vehicle storage barns, etc.

The BTBFMGS 10 is a computer based, software controlled system that generally comprises a central server 18 communicatively connected (wired or wirelessly) to one or more facility computer and/or tablet 22 (e.g., one or more desk-top computer/computer tablet located on site at the respective golf courses, country clubs, resorts, rental facilities, theme parks, airports, military bases, universities, sporting and recreation facilities, etc.). In various instances, it is envisioned that one or more of the facility computers and/or tablets 22 can be located remotely from the respective facility. The central server 18 can be located locally on-site at the respective facility or located remotely from the facility. The BTBFMGS 10 additionally comprises a plurality of vehicle tablets 26 (e.g., computer tablets having internal memory and a processor, and an external touch sensitive screen/display) installed in a plurality of the vehicles 14 (e.g., one tablet 26 installed in each of a plurality of the vehicles 14). The vehicle tablets 26 are structured and operable to communicate with the server 18 via cellular communication technology and protocols, and via wireless (WiFi) communication technology and protocols (e.g., wireless local area network communications). The BTBFMGS 10 further comprises a plurality of vehicle computer modules 30 (e.g., display-less computer modules) installed in a plurality of the vehicles 14 (e.g., one module 30 installed in each of a plurality of the vehicles 14). The vehicle modules 30 are structured and operable to communicate with the server 18 via cellular communication technology and protocols, and via wireless (WiFi) communication technology and protocols. The BTBFMGS 10 still further comprises a plurality of radio frequency identification (RFID) readers 34 installed in a plurality of the vehicles 14 (e.g., one RFID reader 34 installed in each of a plurality of the vehicles 14). The BTBFMGS 10 further yet comprises a plurality of Bluetooth-plus-RFID (BTRFID) beacons or tokens 38 that are structured and operable to be utilized as both vehicle keys, and as terrestrial geographical location markers. The BTRFID beacons 38 that are utilized as vehicle keys will be referred to herein as BTRFID beacon-keys 38A, and the BTRFID beacons 38 that are utilized as terrestrial geographical location markers will be referred to herein as BTRFID beacon-markers 38B.

As described further below, the BTRFID beacons 38 include circuit boards that have Bluetooth beacon circuitry integrated with RFID circuitry and technology thereon. Hence, the BTRFID beacons 38 are structured and operable to provide both Bluetooth communication and near-field communication (e.g., near-field radio-frequency communication). Therefore, the BTRFID beacons 38 are structured and operable to communicate with the vehicle tablets 26 and the vehicle modules 30, via Bluetooth communication technology and protocols, and with the RFID readers 34, via near-field radio-frequency communication technology and protocols.

Referring particularly to FIGS. 2, 3 and 4, each vehicle 14 generally includes a chassis or frame 42, a pair of rear wheels 50 and a pair of front wheels 46 operationally connected to the chassis 42, and a passenger compartment 54. The passenger compartment 54 generally includes a dash console 58, a floorboard 62, and a passenger seating structure 66. The dash console 58 can include one or more instrument displays, gauges, vehicle control devices and/or storage compartments. In various embodiments, the RFID reader 34 can be mounted anywhere on the dash console 58, for example in a location easily accessible by an operator of the vehicle 14. The passenger compartment 54 additionally includes a steering wheel 70 for use by the operator to control the directional movement of the vehicle 14, a brake pedal 74 for use by the operator to control slowing and stopping of the vehicle 14, and an accelerator pedal 76 for use by the operator to control the torque delivered by a prime mover 78 (described below) to one or more of the rear and/or front wheels 46 and/or 50. Particularly, the prime mover 78 is operatively connected to a drivetrain 82 that is operatively connected to at least one of the rear and/or front wheels 46 and/or 50. Each vehicle 14 further comprises a vehicle electrical power source 80 (e.g., one or more battery) that is structured and operable to provide electrical power to various electrical components of the vehicle 14 (e.g., a vehicle motor if the prime mover 78 is an electric motor, and other vehicle electrically operated modules and components), and a vehicle main control module 84 that is communicatively (wired or wirelessly) connected to the a computer-based prime mover control unit (PMCU) 86. The PMCU 86 is structured and operable to control various operations of the vehicle prime mover 78 such as air/fuel ratio, spark timing and engine speed (e.g., RPM) if the prime mover 78 is an internal combustion engine, and motor speed and torque output if the prime mover 78 is an electric motor) and the vehicle main control module 84 is structured and operable to communicate with the PMCU 86 and control various other vehicle modules, devices and operations.

The prime mover 78 can be any device that is structured and operable to generate torque (e.g., motive force, e.g., power) utilized to provide motive force for the vehicle 14 via the drivetrain 82. For example, the prime mover 78 can be an internal combustion engine (ICE), an electric motor, a hybrid combination of an ICE and an electric motor, or any other suitable motive power source and remain within the scope of the present disclosure. Operation of the prime mover 78 is generally controlled by PMCU 86 to generate torque (e.g., motive force, e.g., power) utilized to provide motive force for the vehicle 14 via the drivetrain 82. For example, in various embodiments wherein the prime mover is an internal combustion engine the PMCU 86 can control engine speed and torque output by controlling a fuel/air mixture ratio and/or a spark ignition timing of the engine. Or, for example, in various embodiments wherein the prime mover is an electric motor, the PMCU 86 can control the amount of voltage provided to the motor from one or more battery of the vehicle 14.

Referring now to FIGS. 1, 2, 3 and 4, as described above, the BTBFMGS 10 includes a plurality of vehicle tablets 26 installed in a plurality of vehicles 14. For example, a golf country club or resort can have a fleet of vehicles 14 (i.e., a plurality, e.g., 2-200 or more golf cars) that are provided to guests for use as a golf car and/or personal transport vehicle during their stay at the facility. In such instances, each vehicle 14 will have a vehicle tablet 26 installed therein. In various embodiments, each vehicle tablet 26 is electrically connected to, and powered by, the respective vehicle electrical system (e.g., powered by the vehicle 14 battery bank). Additionally, each vehicle tablet 26 is communicatively connected (wired or wirelessly) to one or more vehicle control module, such as the PMCU 86 and/or the vehicle main control module 84 that is communicatively connected (wired or wirelessly) to the PMCU 86. Each vehicle tablet 26 includes at least one processor and electronic storage module, and is structured and operable to communicate with other computer based devices via cellular and/or WiFi communications technology. In various embodiments, each vehicle tablet 26 can comprise an internal battery for providing electrical power to the respective vehicle tablets 26 without connection to the vehicle electrical system. While in yet other embodiments, the vehicle tablets 26 can comprise an internal battery and be structured and operable to removably connected to the vehicle electrical system such that vehicle tablets can be powered by the vehicle electrical system or by the internal battery when the power from the vehicle electrical system is unavailable.

Similarly, as described above, the BTBFMGS 10 includes a plurality of vehicle modules 30 installed in a plurality of vehicles 14. For example, a golf course, country club, resort, rental facility, theme park, airport, military base, university, or sporting and recreation facility can have a fleet of work, utility or guest transportation vehicles 14 (i.e., a plurality, e.g., 2-200 or more work, utility or guest transportation vehicles) that are utilized by employees of the respective facility for various work related and guest transportation purposes. In such instances, each vehicle 14 will have a vehicle module 30 installed therein. In various embodiments, each vehicle module 30 is electrically connected to, and powered by, the respective vehicle electrical system (e.g., powered by the vehicle 14 battery bank). Additionally, each vehicle module 30 is communicatively connected (wired or wirelessly) to one or more vehicle control module, such as the PMCU 86 and/or the vehicle main control module 84 that is communicatively connected (wired or wirelessly) to the PMCU 86 and/or a voltage control module (e.g., an On/Off switch) for controlling the connection and disconnection of electrical power from one or more vehicle battery to the electrical systems of the vehicle 14. Each vehicle module 30 includes at least one processer and electronic storage module, and is structured and operable to communicate with other computer based devices via cellular and WiFi communications technology.

Referring now to FIGS. 1, 5 and 6, as described above, the BTBFMGS 10 comprises a plurality of Bluetooth-plus-RFID (BTRFID) beacons or tokens 38 that are structured and operable to be utilized as both vehicle beacon-keys 38A, and as terrestrial geographical location markers 38B. The BTRFID beacons 38 are structured and operable to communicate via Bluetooth communication technology with the FMGS vehicle tablets 26 and the FMGS vehicle modules 30. Additionally, the beacons 38 are further structured and operable to communicate with the RFID readers 34 via radio frequency communication technology. Hence, each beacon 38 is structured and operable to communicate both with the FMGS vehicle tablets 26 modules 30, via Bluetooth communication technology, and with the RFID readers 34, via radio frequency communication technology.

Each of the FMGS vehicle tablet and module 26 and 30 are structured and operable to communicate with the beacons 38, via Bluetooth communication technology, and to communicate with the FMGS central server 18 view cellular and/or WiFi communications. For example, when a vehicle 14 is too far away from the FMGS central server 18 or a facility computer 22 to be communicatively connected to the FMGS central server 18 via WiFi signals (e.g., when a golf car 14 is out of WiFi signal range on the golf course, or a resort personal transport vehicle 14 is out of WiFi signal range at a guest's lodging unit), the FMGS vehicle tablet and module 26 and 30 will communicate with the FMGS central server 18 via cellular communication technology. However, when a vehicle 14 is near or in close proximity to (i.e., within WiFi signal range of) the FMGS central server 18, or a facility computer 22 communicatively connected to the FMGS central server 18, the FMGS vehicle tablet and module 26 and 30 will communicate, in real time, with the FMGS central server 18 or facility computer 22 communicatively connected to the FMGS central server 18 via WiFi communication technology.

Each beacon 38 comprises a body, or housing, 90 that encloses a BTRFID circuit board 94 and a battery 98. The battery 98 is electrically connected to, and provides electrical power to, the BTRFID circuit board 94. The BTRFID circuit board 94 comprises a Bluetooth circuitry portion 102 integrated with and electrically connected to a RFID circuitry portion 106. The Bluetooth circuitry portion 102 generally comprises a network interface controller having a specific assigned media access control (MAC) address. Particularly, the Bluetooth circuitry portion 102 of each individual beacon 38 is assigned a unique MAC address that is specific to the respective beacon 38 only and can be used to specifically identify the respective beacon 38. The Bluetooth circuitry portion 102 generally comprises circuitry structured and operable to communicate with the FMGS vehicle tablets 26 and modules 30 via Bluetooth signals and communication protocols. The RFID circuitry portion 106 generally comprises circuitry structured and operable to communicate with the RFID readers 34 via radio frequency signals and communication protocols. Importantly, since the RFID circuitry portion 106 is integrated with Bluetooth circuitry portion 106, the RFID circuitry portion 102 is uniquely associated with the MAC address of the integrated Bluetooth circuitry portion 106 such that when the RFID reader communicates with (e.g., reads) the RFID circuitry portion 102 of the beacon 38 the MAC address of the integrated Bluetooth circuitry portion 106 can be used to identify the respective beacon 38.

Therefore, when the FMGS vehicle tablet or module 26 or 30 of a particular vehicle 14 pairs with, or links to, a beacon 38, via the Bluetooth circuitry portion 106, or the RFID reader 34 of a particular vehicle 14 communicates with (e.g., reads) the RFID circuitry portion 102, the MAC address of the respective beacon 38 is identified by the FMGS vehicle tablet 26 or the FMGS vehicle module 30 communicatively connected to the RFID reader 34. Consequently, all information (e.g., guest and/or employee information) stored within or accessible by the respective vehicle tablet 26 or module 30 that is associated, correlated, linked or paired with the respective specific MAC address can be identified, located and accessed by the respective vehicle tablet 26 or module 30. Hence, the RFID circuitry portion 102 is integrated with the Bluetooth circuitry portion 106 such that all information (e.g., guest and/or employee information) associated, correlated, linked or paired with the respective specific and unique MAC address can be identified, located and accessed by the respective vehicle tablet 26 or module 30 by identifying the respective beacon 38 using the RFID reader 34 to communicate with the RFID circuitry portion 102 and using the Bluetooth circuitry portion 106 to communicate with the vehicle tablet 26.

As illustrated in FIG. 6, each beacon 38 additionally includes a unique machine-readable identification code 110 (e.g., a barcode, a quick response (QR) code, or any other two-dimensional or three-dimensional machine-readable identification code) imprinted on, affixed to, or otherwise disposed on a face of the beacon housing 90. Importantly, since the MAC address is specific to the respective beacon 38 and the respective unique identification code 110 is disposed on and specific to the respective beacon 38, the MAC address and identification code 110 of each beacon 38 are associated, correlated or linked, and the association/correlation/linking can be stored in electronic memory of the FMGS central server 18 (e.g., a database or lookup table within the FMGS central server 18). Therefore, when a beacon 38 is assigned to a facility guest or employee, the beacon identification code 110 can be scanned using any suitable scanning device connected to one or more of the facility FMGS computers 22, and information relating to the guest or employee can be associated, correlated or linked with the respective identification code 110 via execution of BTBFMGS software (e.g., programs and/or algorithms)

stored on and executed by FMGS central server 18 (i.e., executed by one or more processor of the FMGS central server 18). It should be understood that a first portion of the BTBFMGS software is stored on the FMGS central server 18 and second portion of the BTBFMGS software is stored and executed by the FMGS vehicle tablets 26 and modules 30 (i.e., executed by one or more processor of the FMGS vehicle tablets 26 and modules 30).

This association/correlation/linking of guest or employee information and identification code 110 can be stored in the electronic memory of the FMGS central server 18 (e.g., a database or lookup table of the FMGS central server 18) and accessed by any of the FMGS tablets 26, FMGS modules 30 and/or facility computers 22. More particularly, since the unique MAC address and identification code 110 of each beacon 38 are associated/correlated/linked with each other, the guest or employee information can be associated/correlated/linked with the respective MAC address via execution of BTBFMGS software. This association/correlation/linking of guest or employee information and MAC address can be stored in the electronic memory of the FMGS central server 18 (e.g., a database or lookup table of the FMGS central server 18). Therefore, guest or employee information can be accessed by any of the FMGS tablets 26, FMGS modules 30 and/or facility computers 22 upon pairing the respective beacon 38 with a FMGS vehicle tablet 26 or vehicle module 30, via the Bluetooth circuitry portion 106, and upon identifying the respective beacon 38 via the RFID reader 34 and the RFID circuitry portion 102. The guest and employee information can include any information input to, via the facility computers 22 and/or FMGS vehicle tablets 26, and stored on the FMGS central server 18 such as personal information (e.g., the guest or employee name, cell phone number, etc.), guest lodging unit information, guest length of stay at the facility, etc.

Referring now to FIGS. 1, 2, 3, 4, 5, and 6, as described above, in various embodiments the BTBFMGS 10 can be implemented and utilized by a facility such as golf courses, country clubs, resorts, rental facilities, theme parks, airports, military bases, universities, sporting and recreation facilities, etc., to track, monitor and control operations of guest vehicles, such as golf cars and personal transport vehicle, and facility utility vehicles such as turf mowers and work vehicles. For example, in various embodiments wherein the BTBFMGS 10 is implemented and utilized by a resort or golf club, upon arrival a guest would be issued a beacon 38 for use as a key for access to a vehicle 14, e.g., a golf car or personal transport vehicle. As described above, in such instances the beacon will be referred to as the beacon-key 38A.

More specifically, upon arrival of a guest, a facility attendant (e.g., front desk receptionist, facility manager, golf club house attendant, etc.) will access, via a FMGS facility computer 22, the BTBFMGS software stored on the FMGS central server 18. Utilizing the BTBFMGS software the facility attendant will enter the guest information (e.g., the guest name, cell phone number, golf course holes to be played, lodging unit, etc.) and guest authorization parameters or privileges (e.g., what type of vehicle 14 the guest is authorized to drive, the maximum speed the guest is authorized to drive the vehicle 14, the terrestrial geographical areas of the facility property on which the guest is authorized to drive the vehicle 14, etc.) and then scan the beacon identification code 110 of a beacon-key 38A, thereby associating/correlating/linking the respective beacon-key 38A to the guest (e.g., associating/correlating/linking the respective beacon-key 38A to the guest information and guest authorization parameters or privileges) within the FMGS central server 18. As described above, each beacon identification code 110 and Bluetooth circuitry portion MAC address is unique to the respective beacon 38. Therefore, when the facility attendant scans the beacon identification code 110 into the BTBFMGS software, the guest (e.g., guest information and guest authorization parameters or privileges) is also associated/correlated/linked with respective MAC address of the beacon-key 38A. The association/correlation/linking of the guest (e.g., guest information and guest authorization parameters or privileges) with respective MAC is stored in the FMGS central server 18.

In various embodiments, after the guest has been issued a beacon-key 38A, the guest can select any available vehicle 14 (i.e., any vehicle 14 that has not been assigned to another guest) having a FMGS vehicle tablet 26 installed therein, and pair the beacon-key 38A with the FMGS vehicle tablet 26 (i.e., communicatively connect the beacon-key 38A with the FMGS vehicle tablet 26). Particularly, each FMGS vehicle tablet 26 has stored therein the MAC addresses of all the beacons 38 implemented and utilized by the respective facility (e.g., 10s, 100s or 1000s of beacons 38 and MAC addresses). In various embodiments, the tablets 26 are updated/refreshed with the MAC addresses and with various other information/data, such as guest and employee information and authorization parameters, needed to be stored on the tablets 26 via WiFi when in vehicles are within WiFi range of the FMGS central sever 15 and/or within WiFi range of one or more facility computer 22.

In various embodiments, each tablet 26 is constantly scanning for Bluetooth signals from any and all of the beacons 38 (e.g., pinging or refreshing once every 5 to 10 seconds). Therefore, in various embodiments, when a guest approaches an available vehicle 14, the FMGS vehicle tablet 26 will sense, in real time, the guest's beacon-key 38A and inquire whether the guest wants to pair (i.e., communicatively connect) their beacon-key 38A to the respective FMGS vehicle tablet 26. For example, when the FMGS vehicle tablet 26 of a vehicle 14 senses that a guest's beacon-key 38A is within the Bluetooth signal range, the tablet 26 will look up the MAC address of the beacon-key 38A from the database or table of MAC addresses stored in the tablet 26 and identify the guest (e.g., guest information guest authorization parameters). The tablet 26 will then display on the screen thereof an initial pairing screen such as a message inquiring whether the guest would like to pair with the tablets 26 and drive the vehicle 14. The guest can then perform the desired on-screen operations to pair (i.e., communicatively connect) their beacon-key 38A with the respective vehicle tablet 26. In various other embodiments, the guest can select a vehicle 14 and, via the touch screen of the tablet 26 request the tablet 26 "search for key". The tablet 26 will then identify all Bluetooth signals found and list respective beacon-keys 38A on the screen. The guest will then select his/her beacon-key 38A and tablet 26 will pair (i.e., communicatively connect) the guest's beacon-key 38A.

As described above, each FMGS vehicle tablet 26 is communicatively connected (wired or wirelessly) to one or more vehicle control module, such as the PMCU 86 and/or the vehicle main controller 84 that is communicatively connected (wired or wirelessly) to the PMCU 86 and/or a voltage control module (e.g., an electrical switch or relay) for controlling the connection and disconnection of electrical power from one or more vehicle battery to the electrical systems of the vehicle 14. Upon successful pairing of the guest's beacon-key 38A with the vehicle tablet 26, the vehicle tablet 26 will access all the guest information and guest authorization parameters associated/correlated/linked with the MAC address of the respective guest's beacon-key 38A. Subsequently, if the guest information and guest authorization parameters provide authorization to drive the respective vehicle 14 (e.g., authorization to drive a golf car or personal transport vehicle) the vehicle tablet 26 will 'Unlock' the vehicle 14 and enable the vehicle 14 for operation by the guest. For example, the tablet 26 will instruct the voltage control module to electrically connect the vehicle electrical power source to the vehicle electrical systems (e.g., the prime mover 78), and will instruct the PMCU 86 and the vehicle main controller 84 to enable operation of vehicle 14. Thereafter, the vehicle 14 is assigned to the respective guest and can only be operated by the respective guest until the respective guest is deauthorized within the BTBFMGS software of the FMGS central server 18. In various embodiments, when the tablet 26 loses the signal of the a quest beacon-key 38A after a given amount of time the tablet 26 will 'Lock' the vehicle 14 and disable the vehicle 14 for operation by the guest. For example, the tablet 26 will instruct the voltage control module to electrically disconnect the vehicle electrical power source to the vehicle electrical systems (e.g., the prime mover 78), and will instruct the PMCU 86 and the vehicle main controller 84 to disable operation of vehicle 14.

In various instances, the vehicle 14 assignment to the guest can be overridden by a facility employee with a beacon-key 38A having employee authorization parameters associated/corresponding/linked with the MAC address of the respective beacon-key 38A that authorize the employee to operate the vehicle 14

Similarly, in the various exemplary embodiments wherein the BTBFMGS 10 is implemented and utilized by a resort or golf club, one or more facility employee can be issued a beacon 38 for use as a key for access to one or more utility vehicle 14, e.g., a turf mower, a maintenance vehicle, a dump bed utility vehicle, a guest shuttle vehicle, etc. As described above, in such instances the beacon will also be referred to as the beacon-key 38A.

More specifically, when issuing a beacon-key 38A to an employee a facility manager (e.g., a human resources manager) can access, via a FMGS facility computer 22, the BTBFMGS software stored on the FMGS central server 18. Utilizing the BTBFMGS software the facility manager will enter the employee information (e.g., the name, job title, cell phone number, etc.) and employee authorization parameters (e.g., what type of vehicle 14 the employee is authorized to drive, the maximum speed the employee is authorized to drive the vehicle 14, the terrestrial geographical areas of the facility property on which the employee is authorized to drive the vehicle 14, employee operating time, etc.) and then scan the beacon identification code 110 of a beacon-key 38A, thereby associating/correlating/linking the respective beacon-key 38A to the employee (e.g., employee information and employee authorization parameters) within the FMGS central server 18. As described above, each beacon identification code 110 and Bluetooth circuitry portion MAC address is unique to the respective beacon 38. Therefore, when the facility manager scans the beacon identification code 110 into the BTBFMGS software, the employee (e.g., employee information and employee authorization parameters) is also associated/correlated/linked with respective MAC address of the beacon-key 38A. The association/correlation/linking of the employee (e.g., employee information and employee authorization parameters) with respective MAC is stored in the FMGS central server 18.

In various embodiments, after the employee has been issued a beacon-key 38A, the employee can select any vehicle 14 he/she is authorized to operate. In vehicles 14 having a FMGS vehicle tablet 26 installed therein, the employee can pair the beacon-key 38A to the tablet 26 (i.e., communicatively connect the beacon-key 38A with the FMGS vehicle tablet 26) as described above with regard to a guest pairing a beacon-key 38A with at tablet 26. Particularly, when an employee approaches an available vehicle 14, the FMGS vehicle tablet 26 will sense, in real time, the employee's beacon-key 38A and inquire whether the employee wants to pair (i.e., communicatively connect) their beacon-key 38A to the respective FMGS vehicle tablet 26. For example, when the FMGS vehicle tablet 26 of a vehicle 14 senses that an employee's beacon-key 38A is within the Bluetooth signal range, the tablet 26 will look up the MAC address of the beacon-key 38A from the database or table of MAC addresses stored in the tablet 26 and identify the employee (e.g., employee information employee authorization parameters). The tablet 26 will then display on the screen thereof an initial pairing screen such as a message inquiring whether the employee would like to drive the vehicle 14. The employee can then perform the desired on-screen operations to pair (i.e., communicatively connect) their beacon-key 38A with the respective vehicle tablet 26.

As described above, each FMGS vehicle tablet 26 is communicatively connected (wired or wirelessly) to one or more vehicle control module, such as the PMCU 86 and/or the vehicle main control module 84 that is communicatively connected (wired or wirelessly) to the PMCU 86 and/or a voltage control module (e.g., an On/Off switch) for controlling the connection and disconnection of electrical power from one or more vehicle battery to the electrical systems of the vehicle 14. Upon successful pairing of the employee's beacon-key 38A with the vehicle tablet 26, the vehicle tablet 26 will access all the employee information and employee authorization parameters associated/correlated/linked the MAC address of the respective employee's beacon-key 38A. Subsequently, if the employee information and employee authorization parameters provide authorization to drive the respective vehicle 14 (e.g., authorization to drive a turf mower, a maintenance vehicle, a dump bed utility vehicle, a guest shuttle vehicle, etc.) the vehicle tablet 26 will 'Unlock' the vehicle 14 and enable the vehicle 14 for operation by the employee. For example, the tablet 26 will instruct the voltage control module to electrically connect the vehicle electrical power source to the vehicle electrical systems (e.g., the prime mover 78), and will instruct the PMCU 86 and the vehicle main controller 84 to enable operation of vehicle 14.

In various other embodiments, in vehicles 14 having the RFID reader 34 and FMGS vehicle module 30, after the employee has been issued a beacon-key 38A, the employee can select any vehicle 14 he/she is authorized to operate and pass the beacon-key 38A in front of, across or near the RFID reader 34. As described above, the RFID circuitry portion 106 of the beacon 38 BTRFID circuit board 94 is integrated with the Bluetooth circuitry portion 102 such that MAC address of Bluetooth circuitry portion 102 is accessed and identified when the RFID circuitry portion 106 of beacon-key 38A is read by the RFID scanner 34. As with the FMGS vehicle tablets 26, each FMGS vehicle module 30 has stored therein the MAC addresses of all the beacons 38 implemented and utilized by the respective facility (e.g., 10s, 100s or 1000s of beacons 38 and MAC addresses) and is constantly scanning for Bluetooth signals from any and all of the beacons 38. Therefore, since the RFID scanner 34 is communicatively linked to the module 30, when an employee scans the beacon-key 38A using the RFID reader 34 of the selected vehicle 14, the respective module 30 will look up the MAC address of the beacon-key 38A from the database or table of MAC addresses stored in the module 30 and identify the employee (e.g., employee information employee authorization parameters).

As described above, each module 30 is communicatively connected (wired or wirelessly) to one or more vehicle control module, such as the PMCU 86 and/or the vehicle main control module 84 that is communicatively connected (wired or wirelessly) to the PMCU 86 and/or a voltage control module (e.g., an On/Off switch) for controlling the connection and disconnection of electrical power from one or more vehicle battery to the electrical systems of the vehicle 14. Upon successfully identifying the MAC address of the employee's beacon-key 38A, via the RFID reader 34 and the vehicle module 30, the vehicle module 30 will access all the employee information and employee authorization parameters associated/correlated/linked the MAC address of the respective employee's beacon-key 38A. Subsequently, if the employee information and employee authorization parameters provide authorization to drive the respective vehicle 14 (e.g., authorization to drive a turf mower, a maintenance vehicle, a dump bed utility vehicle, a guest shuttle vehicle, etc.) the vehicle module 30 will 'Unlock' the vehicle 14 and enable the vehicle 14 for operation by the employee. For example, the module 26 will instruct the voltage control module to electrically connect the vehicle electrical power source to the vehicle electrical systems (e.g., the prime mover 78), and will instruct the PMCU 86 and the vehicle main controller 84 to enable operation of vehicle 14.

Referring now to FIGS. 1, 2, 3, 4, 5, 6 and 7, as described above, the BTBFMGS 10 is structured and operable to be utilized by facilities to track, monitor and control operations of guest vehicles 14 and facility utility vehicles 14. More particularly, further to the implementation and use of the BTBFMGS 10 to assign vehicles 14 to facility guests and employees described above, the BTBFMGS 10 can be implemented and used to track and monitor the terrestrial geolocation of the vehicles 14 and control the operation of the vehicles 14 based on the guest/employee authorization parameters and the tracked/monitored geolocation of the vehicle 14 (sometimes known as geofencing). Moreover, the geofencing features and capabilities of the BTBFMGS 10 are implemented and executed without the use of satellite based global positioning systems (GPS) that are utilized by known geofencing system.

For example, once a vehicle 14 is paired or registered to a guest or employee (e.g., once the FMGS vehicle tablet 26 or module 30 is paired with the guest's or employee's beacon-key 38A), the respective tablet 26 or module 30 will control operational parameters of the respective vehicle 14 such as operational status (lock/unlock) and vehicle speed. As an example, if a golf car 14 is paired/registered to a guest, the guest's authorization parameters stored in the FMGS central server 18 and communicated to the respective vehicle tablet 26 might stipulate that the guest cannot drive the vehicle 14 over a stipulated maximum speed threshold (e.g., 15-20 mph). In such instances, the tablet 26 of the vehicle 14 that the guest is paired/registered to would control operation of the vehicle main control module 84 and/or the PMCU 86, which would in turn control operation of the prime mover 78, to restrict speed of the golf car 14 so as not to exceed the maximum speed threshold (e.g., 15-20 mph). Similarly, if a facility utility vehicle 14 is paired/registered to an employee, the employee's authorization parameters stored in the FMGS central server 18 and communicated to the respective vehicle module 30 might stipulate that the employee cannot drive a vehicle 14 over a stipulated maximum speed threshold (e.g., 20-25 mph). In such instances the module 30 would control operation of the vehicle main control module 84 and/or the PMCU 86, which would in turn control operation of the prime mover 78, to restrict speed of the utility vehicle 14 so as not to exceed a maximum speed threshold (e.g., 20-25 mph).

Furthermore, as exemplarily shown in FIG. 7, in addition to use as beacon-keys 38A, the beacons 38 can be used as beacon-markers 38B that can be placed, located, affixed or otherwise disposed at precise terrestrial geographical locations of the respective facility grounds or property to control the operation of selected vehicles 14. As described above, the MAC address and identification code 110 of each beacon 38 are associated, correlated or linked, and the association/correlation/linking can be stored in electronic memory of the FMGS central server 18 (e.g., a database or lookup table within the FMGS central server 18). Therefore, when a beacon 38 is to be used as a beacon-marker 38B, the identification code 110 can be scanned using any suitable scanning device connected to one or more facility FMGS computer 22, and information and/or data relating to the terrestrial geographical location at which the respective beacon-marker 38B is, or is to be placed, located, affixed or otherwise disposed can be entered and stored, via the BTBFMGS software, in a database or table of FMGS central server 18.

Accordingly, the terrestrial geographical location information/data is associated/correlated/linked with the identification code 110 of the respective beacon-marker 38B and stored in electronic memory of the FMGS central server 18 (e.g., a database or lookup table within the FMGS central server 18). The terrestrial geographical information can comprise any desired information such as word description identifying the physical location at which the respective beacon-marker 38B is, or is to be, placed, located, affixed or otherwise disposed. The terrestrial geographical data can comprise any desired known or unknown terrestrial geographical data such as latitude and longitude, or vector data, or raster data, etc., identifying the physical location at which the respective beacon-marker 38B is, or is to be, placed, located, affixed or otherwise disposed. Additionally, various vehicle control parameters can be entered and stored in a database or table of FMGS central server 18, and thereby associated/correlated/linked with the identification code 110 of the respective beacon-marker 38B. Since the MAC address and identification code 110 of each beacon-marker 38B are associated/correlated/linked, the vehicle terrestrial geographical location information/data and control parameters are further linked with the MAC address and stored within a database of table of the FMGS central server 18.

The vehicle control parameters can comprise various vehicle control operations or procedures that are to be implemented by the respective vehicle tablet 26 or module 30 when the Bluetooth signals of any particular beacon-marker 38B are sensed, in real time, by the respective tablet 26 or module 30. For example, the vehicle control parameters of a beacon-marker 38B disposed or located near a bridge can stipulate that any vehicle 14 near the bridge (i.e., within Bluetooth signal range of the respective beacon-marker 38B) cannot exceed a limited speed threshold (e.g., 5-10 mph). As described above, the FMGS vehicle tablets 26 and modules 30 are constantly scanning for Bluetooth signals from any and all of the beacons 38 (e.g., pinging or refreshing once every 5 to 10 seconds). Therefore, in such instances, when the vehicle 14 approaches the beacon-marker 38B disposed near the bridge the respective tablet 26 or module 30 will sense, in real time, the Bluetooth signals, read the MAC address of the beacon-marker 38B, and look up the control parameters associated with the MAC address. Then, based on these control parameters, the respective tablet 26 or module 30 would control operation of the vehicle main control module 84 and/or the PMCU 86, which would in turn control operation of the prime mover 78, to restrict speed of the vehicle 14 so as not to exceed the limited speed threshold (e.g., 5-10 mph) when within the Bluetooth signal range of the respective beacon-marker 38B.

Or, as another example, the vehicle control parameters associated with the MAC address of a beacon-marker 38B disposed or located near a lake, river, sand trap, tall grass area, or putting green can stipulate that any vehicle 14 near the lake, river, sand trap, tall grass area, or putting green (i.e., within Bluetooth signal range of the respective beacon-marker 38B) cannot exceed a limited speed threshold (e.g., 1-2 mph), and/or that vehicle must stop and no longer be operable to advance in a forward direction, but only in a reverse/back direction. Therefore, in such instances, when the vehicle 14 approaches the beacon-marker 38B near the lake, river, sand trap, tall grass area, or putting green the respective tablet 26 or module 30 will sense, in real time, the Bluetooth signals, read the MAC address of the beacon-marker 38B, and look up the control parameters associated with the MAC address. Then, based on these control parameters, the tablet 26 or module 30 of the respective vehicle 14 would control operation of the vehicle main control module 84 and/or the PMCU 86, which would in turn control operation of the prime mover 78, to restrict the speed of the vehicle 14 to the limited threshold (e.g., 1-2 mph), and/or stop the vehicle 14 and/or control the direction of motive force generated by the prime mover (e.g., no longer allow the vehicle to be operable to advance in a forward direction, but only in a reverse/back direction). The controlling of the speed of, and/or direction of motive force generated by, prime mover can be accomplished using any suitable means, method or device. For example, in instances wherein the prime mover 78 is and internal combustion engine, control of the speed and direction of motive force can be accomplished using the PMCU 86 to control the fuel ratio and spark plug timing and/or controlling a vehicle transmission, differential and/or transaxle operatively connected to the engine. Or, in instances wherein the prime mover 78 is an electric motor, control of the speed and direction of motive force can be accomplished using the PMCU 86 to control the voltage level and current flow direction provided by the electrical power source 80 to the motor.

In other exemplary embodiments, the beacon-markers 38B can be used to monitor and track the location of any vehicle 14. As described above, the MAC address of each beacon-marker 38B is stored in the FMGS central server 18 and associated/correlated/linked with the terrestrial geographical location information/data of where the respective beacon-marker 38B is, or is to be placed, located, affixed or otherwise disposed. Therefore, in various embodiments, when a vehicle 14 is near or in close proximity to a beacon-marker 38B, the FMGS vehicle tablet 26 or module 30 of the respective vehicle 14 will sense, in real time, the Bluetooth signals being emitted by a given beacon-marker 38B, read the MAC address of the beacon-marker 38B, and look up the terrestrial geographical location information/data associated with the MAC address, thereby identifying the terrestrial geographical location of the vehicle 14. Thereafter, the vehicle tablet 26 or module 30 can communicate (via WiFi or Cellular) the terrestrial geographical location information/data to the FMGS central server 18, whereby the location information/data of the respective vehicle 14 can be accessed and viewed by one or more FMGS facility computer 22. Accordingly, the terrestrial geographical location of any and all vehicles 14 can be tracked and monitored using the beacon-markers 38B of BTBFMGS 10 absent any need for or use of a satellite based geolocation/positioning system (i.e., absent any need for use of GPS).

In yet other exemplary embodiments, the beacon-markers 38B can be placed, located, affixed or otherwise disposed in locations that are not accessible to or by satellite signals such as underground (e.g., in a cave or parking garage), inside a building such as a vehicle storage facility (e.g., a golf car storage barn), a warehouse, etc. In such instances, the BTBFMGS 10 functions and operates as described above with regard to monitoring and tracking the location of the vehicles 14 via the beacon-markers 38B. For example, the beacon-markers 38B can be placed, located, affixed or otherwise disposed in a drive through tourist attracting cave or cavern, or an underground parking garage, or an indoor storage facility. In such instances when a vehicle 14 is near or in close proximity to a beacon-marker 38B, the FMGS vehicle tablet 26 or module 30 of the respective vehicle 14 will sense, in real time, the Bluetooth signals emitted by a given beacon-marker 38B, read the MAC address of the beacon-marker 38B, and look up the terrestrial geographical location information/data associated with the MAC address, thereby identifying the terrestrial geographical location of the vehicle 14. Thereafter, the vehicle tablet 26 or module 30 can communicate (via WiFi or Cellular) the terrestrial geographical location information/data to the FMGS central server 18, whereby the location information/data of the respective vehicle 14 can be accessed and viewed by one or more FMGS facility computer 22. Accordingly, the terrestrial geographical location of any and all vehicles 14 can be tracked and monitored using the beacon-markers 38B of BTBFMGS 10 absent any need for or use of a satellite based geolocation/positioning system (i.e., absent any need for use of GPS).

It is further envisioned that in various embodiments, various tablet display instructions can be also associated/correlated/linked with the MAC of various beacon-markers 38B. The tablet display instructions can comprise links to videos to be played by and shown on the screen of any given FMGS vehicle tablet 26, and/or a message, instructions, and/or warning to be shown on the screen of any given FMGS vehicle tablet 26, and/or any other graphic or picture be shown on the screen of any given FMGS vehicle tablet 26. In such instances, when a vehicle 14 is near or in close proximity to a beacon-marker 38B, such as for example a beacon-marker 38B disposed by a lake, and/or near scenic view, and/or near a historic landmark, and/or near portions of a cavern tour, and/or near a hazard of some sort, and/or near an environmental reserve, and/or near a particular restaurant, etc., the FMGS vehicle tablet 26 or module 30 of the respective vehicle 14 will sense, in real time, the Bluetooth signals emitted by a given beacon-marker 38B. The tablet 26 will read the MAC address of the beacon-marker 38B and look up the tablet display instructions associated with the MAC address. Thereafter, the vehicle tablet 26 would execute the tablet display instructions associated with the respective MAC address. For example, the tablet 26 would play a video welcoming a guest to a tourist attraction, and/or informing the guest about a particular portion of a tourist attraction, and/or informing the guest about the history of a particular historic site, and/or informing a guest about a particular environmental habitat, and/or warning a guest about a particular hazard, and/or the menu of a particular nearby restaurant, etc.

It is still further envisioned that in various embodiments, the tracking and monitoring functionality of the BTBFMGS can be used to monitor the location and efficiency of a facility employee. For example, when an employee is assigned a beacon-key 38A he/she pairs the beacon-key 38A with a particular vehicle 14, the employer can monitor and track the location of the employ by tracking and monitoring the location of the respective vehicle 14 utilizing the BTBFMGS 10 as described above. Additionally, the employer can monitor how long the employee (more specifically, the vehicle paired with the employee's beacon-key 38A) is at a certain location, and thereby monitor and track the employee's work task efficiency. For example, if an employee is tasked with cutting nine greens of a golf course, the employee will pair his/her beacon-key 38A to a greens mower, and the employer can track and monitor when the employee/greens mower arrives at and leaves each green utilizing beacon-markers 38B disposed at each green, thereby monitoring and tracking the employee's efficiency of the work task of mowing the greens.

It should be understood that although the FMGS central server 18 is sometimes described herein as directly controlling the various automated, or robotic, operations of the BTBFMGS 10, it is the execution of the portion of the BTBFMGS software, programs and/or algorithms stored on the FMGS central server 18 by at least one processor of the FMGS central server 18 using inputs from: the FMGS vehicle tablets 26 and modules 30; and/or a user interface (e.g., keyboard and/or touch screen) of any of the FMGS central server 18, FMGS facility computers 22 and/or FMGS vehicle tablets 26; and/or an identification code reader connected to the FMGS central server 18 and/or FMGS facility computers 22; and/or various data tables, databases, lookup table, etc. electronically stored on the FMGS central server 18; and/or various other components, sensors, systems and assemblies of the BTBFMGS 10 that actually control the various automated, or robotic, operations of the BTBFMGS 10 described herein. Similarly, it should be understood that although the FMGS vehicle tablets 26 and modules 30 are sometimes described herein as directly controlling the various automated, or robotic, operations of the BTBFMGS 10 and the vehicles 14, it is the execution of the portion of the BTBFMGS software, programs and/or algorithms stored on the FMGS vehicle tablets 26 and modules 30 by at least one processor of the respective FMGS vehicle tablets 26 and modules 30 using inputs from: the FMGS central server 18; and/or a user interface (e.g., touch screen) of the FMGS vehicle tablets 26; and/or various data tables, databases, lookup table, etc., electronically stored on the respective FMGS vehicle tablet 26 that actually control the various automated, or robotic, operations of the FMGS vehicle tablets 26 and modules 30 described herein.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A Bluetooth plus radio frequency identification (RFID) beacon for use in a vehicle fleet management and geofencing system, said beacon comprising:
   a housing; and
   a circuit board disposed within the housing, the circuit board comprising:
      a Bluetooth communication circuitry portion containing a unique media access control (MAC) address; and
      an RFID circuitry portion structured and operable to communicate with an RFID reader, the RFID circuitry portion integrated with the Bluetooth communication circuitry portion and is associated with the Bluetooth circuitry MAC address such that when the RFID reader communicates with the RFID circuitry portion the Bluetooth beacon will be identified by the RFID reader using the MAC address of the Bluetooth communication circuitry portion.

2. The beacon of claim 1 further comprising a machine readable identification code disposed on the housing, the machine readable identification code utilizable to assign the beacon to one of a facility guest or employee by associating the machine readable identification code with the MAC address.

3. The beacon of claim 2, wherein the machine readable identification code is a quick response (QR) code.

4. The beacon of claim 1 further comprising a battery for powering the circuit board.

5. A Bluetooth beacon based fleet management and geofencing system, said system comprising:
   a fleet management and geofencing system (FMGS) central server;
   at least one FMGS facility computer communicatively connected to the central server;
   a plurality of FMGS tablets communicatively connected to the central server, each FMGS tablet disposed in a respective one of a plurality of facility guest vehicles, each FMGS tablet structured and operable for Bluetooth communication;
   a plurality of FMGS computer modules communicatively connected to the central server, each FMGS computer module disposed in a respective one of a plurality of facility utility vehicles;
   a plurality of radio frequency identification (RFID) readers each RFID reader disposed in a respective one of the plurality of facility utility vehicles and communicatively connected to the respective FMGS computer module; and
   a plurality of Bluetooth plus RFID beacons, each beacon structured and operable to communicate with the plurality of FMGS tablets via Bluetooth communication and with the plurality of RFID reader via radio frequency communication, each beacon comprising:
      a housing; and
      a circuit board disposed within the housing, the circuit board comprising:
         a Bluetooth communication circuitry portion containing a unique media access control (MAC) address; and
         an RFID circuitry portion structured and operable to communicate with an RFID reader, the RFID circuitry portion integrated with the Bluetooth communication circuitry portion and is associated with the Bluetooth circuitry MAC address such that when the RFID reader communicates with the RFID circuitry portion the Bluetooth beacon will be identified by the RFID reader using the MAC address of the Bluetooth communication circuitry portion.

6. The system of claim 5 further comprising a machine readable identification code disposed on the housing, the machine readable identification code associated with the MAC address of the respective beacon within system software executed by the FMGS central server.

7. The system of claim 6, wherein the machine readable identification code is a quick response (QR) code.

8. The system of claim 6, wherein each beacon is structured and operable to be assigned, via association of the identification code with the MAC address of the respective beacon, to one of:
- a respective facility guest and be utilized by the guest as a Bluetooth key for enabling and disabling operation of one of the facility guest vehicles,
- a respective facility employee and be utilized by the employee as a RFID employee identification badge for enabling and disabling operation of one of the facility utility vehicles, and
- a terrestrial geographical location for use as a geofencing and location tracking marker for the facility guest vehicles and the facility utility vehicles.

9. The system of claim 8, wherein each beacon assigned to a terrestrial geographical location for use as the geofencing and location tracking marker is disposed at the respective assigned terrestrial geographical location.

10. The system of claim 9, wherein each FMGS tablet is communicatively connected to at least one facility guest vehicle control module that is structured and operable to control at least one facility guest vehicle operational parameter, and each FMGS computer module is communicatively connected to at least one facility utility vehicle control module that is structured and operable to control at least one facility utility vehicle operational parameter, such that each FMGS tablet can control the at least one facility guest vehicle operational parameter, and each FMGS computer module can control the at least one facility utility vehicle operational parameter based on at least one of:
- guest authorization parameters associated with the MAC address of the beacon assigned to the respective facility guest, and
- employee authorization parameters associated with the MAC address of the beacon assigned to the respective facility employee.

11. The system of claim 10, wherein the at least one facility guest vehicle operational parameter comprises at least one of:
- a locked/unlocked operational status of the facility guest vehicle;
- vehicle speed, via control of a facility guest vehicle prime mover; and
- direction of motive force generated by the facility guest vehicle prime mover.

12. The system of claim 11, wherein the at least one facility utility vehicle operational parameter comprises at least one of:
- a locked/unlocked operational status of the facility utility vehicle;
- vehicle speed, via control of a facility utility vehicle prime mover; and
- direction of motive force generated by the facility utility vehicle prime mover.

13. The system of 12, wherein each FMGS tablet and each FMGS computer module is structured and operable to communicate with the beacons utilized as geofencing and location tracking markers, via Bluetooth communications, and communicate with the FMGS central server, via at least one of cellular communication and WiFi communications, to provide vehicle location information to the FMGS central server.

14. The system of claim 13, wherein the assigned terrestrial geographical location is a terrestrial geographical location that is not accessible to global positioning system (GPS) satellite signals.

15. A Bluetooth beacon based fleet management and geofencing system, said system comprising:
- a fleet management and geofencing system (FMGS) central server;
- at least one FMGS facility computer communicatively connected to the central server;
- a plurality of FMGS tablets communicatively connected to the central server, each FMGS tablet disposed in a respective one of a plurality of facility guest vehicles, each FMGS tablet structured and operable for Bluetooth communication;
- a plurality of FMGS computer modules communicatively connected to the central server, each FMGS computer module disposed in a respective one of a plurality of facility utility vehicles;
- a plurality of radio frequency identification (RFID) readers each RFID reader disposed in a respective one of the plurality of facility utility vehicles and communicatively connected to the respective FMGS computer module; and
- a plurality of Bluetooth plus RFID beacons, each beacon structured and operable to communicate with the plurality of FMGS tablets via Bluetooth communication and with the plurality of RFID reader via radio frequency communication, each beacon comprising:
  - a housing;
  - a circuit board disposed within the housing, the circuit board comprising:
    - a Bluetooth communication circuitry portion containing a unique media access control (MAC) address; and
    - an RFID circuitry portion structured and operable to communicate with an RFID reader, the RFID circuitry portion integrated with the Bluetooth communication circuitry portion and is associated with the Bluetooth circuitry MAC address such that when the RFID reader communicates with the RFID circuitry portion the Bluetooth beacon will be identified by the RFID reader using the MAC address of the Bluetooth communication circuitry portion; and
  - a machine readable identification code disposed on the housing, the machine readable identification code associated with the MAC address of the respective beacon within system software executed by the FMGS central server;

wherein each beacon is structured and operable to be assigned, via association of the identification code with the MAC address of the respective beacon, to one of:
- a respective facility guest and be utilized by the guest as a Bluetooth key for enabling and disabling operation of one of the facility guest vehicles, and a respective facility employee and be utilized by the employee as a RFID employee identification badge for enabling and disabling operation of one of the facility utility vehicles.

16. The system of claim 15, wherein the machine readable identification code is a quick response (QR) code.

17. The system of claim 15, wherein each FMGS tablet is communicatively connected to at least one facility guest vehicle control module that is structured and operable to control at least one facility guest vehicle operational parameter, and each FMGS computer module is communicatively connected to at least one facility utility vehicle control module that is structured and operable to control at least one facility utility vehicle operational parameter, such that each FMGS tablet can control the at least one facility guest vehicle operational parameter, and each FMGS computer module can control the at least one facility utility vehicle operational parameter based on at least one of:

guest authorization parameters associated with the MAC address of the beacon assigned to the respective facility guest, and employee authorization parameters associated with the MAC address of the beacon assigned to the respective facility employee.

18. The system of claim 17, wherein the at least one facility guest vehicle operational parameter comprises at least one of:

a locked/unlocked operational status of the facility guest vehicle;

vehicle speed, via control of a facility guest vehicle prime mover; and direction of motive force generated by the facility guest vehicle prime mover.

19. The system of claim 18, wherein the at least one facility utility vehicle operational parameter comprises at least one of:

a locked/unlocked operational status of the facility utility vehicle;

vehicle speed, via control of a facility utility vehicle prime mover; and direction of motive force generated by the facility utility vehicle prime mover.

20. The system of 19, wherein each FMGS tablet and each FMGS computer module is structured and operable to communicate with the beacons via Bluetooth communications, and communicate with the FMGS central server via at least one of cellular communication and WiFi communications.

* * * * *